(12) United States Patent
Yamaguchi et al.

(10) Patent No.: US 10,648,833 B2
(45) Date of Patent: May 12, 2020

(54) LINEAR SCALE

(71) Applicant: Mitutoyo Corporation, Kawasaki-shi, Kanagawa (JP)

(72) Inventors: Yasuo Yamaguchi, Tokyo (JP); Tomoyuki Otake, Kanagawa (JP)

(73) Assignee: MITUTOYO CORPORATION, Kawasaki-shi (JP)

( * ) Notice: Subject to any disclaimer, the term of this patent is extended or adjusted under 35 U.S.C. 154(b) by 225 days.

(21) Appl. No.: 16/007,466

(22) Filed: Jun. 13, 2018

(65) Prior Publication Data

US 2019/0011284 A1  Jan. 10, 2019

(30) Foreign Application Priority Data

Jul. 5, 2017 (JP) .................................. 2017-132052

(51) Int. Cl.
```
G01D 5/347      (2006.01)
G01D 5/00       (2006.01)
F16C 17/02      (2006.01)
F16C 17/26      (2006.01)
G01D 11/30      (2006.01)
G01D 5/244      (2006.01)
```

(52) U.S. Cl.
CPC .............. *G01D 5/00* (2013.01); *F16C 17/02* (2013.01); *F16C 17/26* (2013.01); *G01D 5/24442* (2013.01); *G01D 11/30* (2013.01)

(58) Field of Classification Search
CPC ....................................................... G01C 17/26
USPC .......................................... 33/706, 707, 708
See application file for complete search history.

(56) References Cited

U.S. PATENT DOCUMENTS

| | | | | | |
|---|---|---|---|---|---|
| 4,569,137 | A | * | 2/1986 | Ichikawa | G01D 5/34707 33/706 |
| 4,649,648 | A | * | 3/1987 | Nagaoka | G01B 7/02 33/700 |
| 4,843,729 | A | * | 7/1989 | Nagaoka | G01B 7/16 33/708 |
| 5,713,136 | A | * | 2/1998 | Takei | G01B 3/008 33/501.02 |
| 5,842,283 | A | * | 12/1998 | Yatsu | F16C 29/005 33/706 |
| 6,766,587 | B2 | * | 7/2004 | Kawada | G01D 5/34753 33/702 |

(Continued)

FOREIGN PATENT DOCUMENTS

JP  2003-097936  4/2003

*Primary Examiner* — George B Bennett
(74) *Attorney, Agent, or Firm* — Rankin, Hill & Clark LLP

(57) ABSTRACT

A measurement device includes: attachment holes, provided on a scale frame with respect to a measurement direction; rear-face bushings inserted into the attachment holes from a rear face side of the scale frame; and fasteners that fix the scale frame to first measurement target part. Each of the rear-face bushings includes: a cylinder part, which is formed shorter than the length of the attachment holes with respect to a penetration direction and is formed having an outer diameter smaller than the inner diameter of the attachment holes; a flange, which is formed at the end of the cylinder part located toward the first measurement target part and which has an outer diameter greater than the inner diameter of the attachment holes; and an elastic member, which is cylindrical in shape and is provided covering the outer circumferential surface of the cylinder part.

10 Claims, 8 Drawing Sheets

(56) References Cited

U.S. PATENT DOCUMENTS

| | | |
|---|---|---|
| 2003/0056387 A1 | 3/2003 | Kawada |
| 2003/0182816 A1* | 10/2003 | Huber .................... F16C 29/00 33/707 |
| 2004/0154181 A1* | 8/2004 | Nakamura ......... G01D 5/34707 33/706 |
| 2004/0261283 A1* | 12/2004 | Falkinger ........... G01D 5/24442 33/707 |
| 2010/0175272 A1* | 7/2010 | Rudy ................. F16C 29/0633 33/708 |
| 2014/0338208 A1* | 11/2014 | Sugamata .......... G01D 5/24442 33/706 |
| 2016/0102958 A1* | 4/2016 | Fischer ............... G01B 3/1061 33/707 |
| 2016/0187117 A1* | 6/2016 | Otsuka ................. G01B 3/1071 33/770 |

\* cited by examiner

LINEAR SCALE

TECHNICAL FIELD

The present invention relates to a linear scale.

BACKGROUND ART

A measurement device (linear scale) which includes a long scale frame with a built-in scale and a detector that detects an amount of relative movement with the scale, and which measures the distance of movement between a pair of measurement target parts in a machine tool or the like, is known. In such a linear scale, a first measurement target part in the pair of measurement target parts is fixed to the scale frame, and a second measurement target part is fixed to the detector. The linear scale measures the distance of movement between the measurement target parts by the detector reading the amount of relative movement with respect to the scale built into the scale frame.

Here, the scale frame is formed from aluminum, for example, while the first measurement target part is formed from iron, for example. The coefficient of linear expansion of aluminum is $23 \times 10^{-6}$/K, whereas the coefficient of linear expansion of iron is from 11 to $12 \times 10^{-6}$/K. When thermal expansion occurs due to changes in the ambient temperature of the linear scale and the like, the expansion/contraction of the scale frame (which is aluminum) will be restricted by the first measurement target part (iron) due to difference in the coefficients of linear expansion, which produces thermal stress.

If thermal stress arises, the scale frame will experience deformations such as expansion/contraction, bending, or twisting. Furthermore, if the scale frame deforms, the scale which is built into the scale frame will also deform by bending, twisting, or the like. If the scale deforms, a problem will arise in that the detector will detect the amount of relative movement with respect to the scale with reduced precision.

Here, "expansion/contraction" of the scale frame caused by heat refers to deformation in a direction parallel to the measurement direction of the linear scale. "Bending" of the scale frame caused by thermal stress refers to deformation in a direction perpendicular to the measurement direction of the linear scale.

Patent Document 1, for example, discloses a unit-type linear displacement measurement apparatus (a linear scale) that addresses the above-described problem. This apparatus includes a frame body (a scale frame), extending in a length measurement direction (a measurement direction) and containing a main scale (a scale), and end portion fixed members (fixed blocks) attached to both ends of the frame body in the length measurement direction.

The frame body includes frame body end portions, which are located on both ends in the length measurement direction and are machined so as to be capable of connecting with the end portion fixed members, and a plate spring mechanism configured to be capable of absorbing bending in the frame body produced by the connections between the end portion fixed members and the frame body end portions.

The plate spring mechanism includes a plate formed so as to extend from the frame body end portions in the length measurement direction, and is configured by connecting that plate to the end portion fixed members.

Each of the end portion fixed members include an attachment hole for attaching the frame body to a measurement subject (the first measurement target part) and a parallel plate spring mechanism configured to be capable of absorbing expansion/contraction arising in the frame body.

The parallel plate spring mechanism includes two plate-shaped members formed by providing cutouts and cavities in the end portion fixed member. The plate-shaped members extend in a width direction of the frame body, which is perpendicular to the length measurement direction. The parallel plate spring mechanism is constituted by these two plate-shaped members.

According to the unit-type linear displacement measurement apparatus, the plate spring mechanism absorbs bending in the frame body, and the parallel plate spring mechanism absorbs expansion/contraction of the frame body.

CITATION LIST

Patent Literature

Patent Document 1: JP 2003-097936 A

SUMMARY OF INVENTION

Technical Problem

However, in this kind of linear scale, the plate spring mechanism that absorbs bending in the scale frame and the parallel plate spring mechanism that absorbs expansion/contraction of the scale frame are manufactured through a cutting process. Thus, the linear scale has problems in that the cutting process incurs high manufacturing costs, and the manufacturing takes time.

An object of the invention is to provide a linear scale that ensures the precision of detection by a detector by suppressing deformation of a scale, reduces manufacturing costs, and improves manufacturing efficiency.

Solution to Problem

A linear scale according to the invention includes: a long scale frame, the long scale frame being fixed to a first measurement target part and containing a scale; a detector, the detector being fixed to a second measurement target part and configured to detect an amount of relative movement with the scale; attachment holes, the attachment holes being provided on both of one end side and another end side of the scale frame with respect to a measurement direction, the attachment holes being formed penetrating from a rear face of the scale frame facing the first measurement target part to a front face of the scale frame located on the side opposite from the side on which the first measurement target part is located; rear-face bushings inserted into the attachment holes from a rear face side of the scale frame; and fasteners configured to fix the scale frame to the first measurement target part through the attachment holes and the rear-face bushings. Each of the rear-face bushings includes: a cylinder part formed shorter than the length of the attachment hole with respect to a penetration direction and having an outer diameter smaller than an inner diameter of the attachment holes; a flange formed at the end of the cylinder part located toward the first measurement target part and having an outer diameter greater than the inner diameter of the attachment holes; and an elastic member, the elastic member having a cylindrical shape and being provided covering an outer circumferential surface of the cylinder part. Each of the fasteners includes: a shaft part inserted into the cylinder part; and a head part having an outer diameter greater than the inner diameter of the attachment holes.

According to the invention configured in this manner, each of the rear-face bushings of the linear scale includes: the cylinder part, which is formed shorter than the length of the attachment hole with respect to the penetration direction and is formed having an outer diameter smaller than the inner diameter of the attachment hole; the flange, which is formed at the end of the cylinder part located toward the first measurement target part and which has an outer diameter greater than the inner diameter of the attachment hole; and the elastic member, which is cylindrical in shape and is provided covering the outer circumferential surface of the cylinder part. Accordingly, thermal stress arising in the scale frame can be absorbed by the elastic members without inhibiting expansion/contraction of the scale frame caused by heat. Additionally, the linear scale can easily absorb thermal stress arising in the scale frame simply by inserting the rear-face bushings according to the invention into the attachment hole, without the need for a process such as cutting to be carried out on a parallel plate spring mechanism or the like.

Accordingly, the linear scale can ensure the precision of detection by the detector by suppressing deformation of the scale, can reduce manufacturing costs, and can improve manufacturing efficiency.

Additionally, the rear-face bushings are inserted into the attachment holes from the rear face side of the scale frame, and thus a gap is formed by the flanges between the first measurement target part and the scale frame. The rear-face bushings separate the first measurement target part and the scale frame as a result, and thus the linear scale can suppress the transmission of heat from the first measurement target part to the scale frame and suppress the occurrence of thermal stress.

Additionally, each of the fasteners includes: the shaft part, which is inserted into the cylinder part formed shorter than the length of the attachment hole with respect to the penetration direction; and the head part, which has an outer diameter greater than the inner diameter of the attachment hole. Accordingly, the scale frame can be fixed to the first measurement target part through the rear-face bushings and the attachment holes.

Preferably, the linear scale further includes front-face bushings inserted into the attachment holes from a front face side of the scale frame. Each of the front-face bushings includes: a cylinder part formed shorter than the length of the attachment hole with respect to a penetration direction and having an outer diameter smaller than an inner diameter of the attachment holes; a flange formed at the end of the cylinder part located toward the front face side of the scale frame and having an outer diameter greater than the inner diameter of the attachment holes; and an elastic member, the elastic member having a cylindrical shape and being provided covering an outer circumferential surface of the cylinder part. The cylinder parts of the rear-face bushings and the front-face bushings are formed at lengths ensuring that the cylinder parts do not contact each other within the attachment holes. The fasteners are configured to fix the scale frame to the first measurement target part through the rear-face bushings, the front-face bushings, and the attachment holes.

In the linear scale, in a case where the scale frame has been fixed to the first measurement target part by the fasteners through the rear-face bushings and the attachment holes, the scale frame and the fasteners will be in direct contact. This produces friction between the respective contact surfaces, and fixes the elements rigidly. There is thus a problem in that the elastic members of the rear-face bushings cannot absorb thermal stress efficiently.

However, according to the invention, the linear scale further includes the front-face bushings, each of which is constituted by: the cylinder part and the elastic member, which have the same configurations as the corresponding elements of the rear-face bushing; and the flange, which is formed at the end of the cylinder part located toward the front face side of the scale frame and which has an outer diameter greater than the inner diameter of the attachment hole. The fasteners are configured to fix the scale frame to the first measurement target part by being passed through the rear-face bushings, the front-face bushings, and the attachment holes. The fasteners thus indirectly fix the scale frame to the first measurement target part through the front-face bushings, and as a result, the elastic members of the rear-face bushings and the front-face bushings can efficiently absorb thermal stress arising in the scale frame.

Additionally, the cylinder parts of the rear-face bushings and the front-face bushings are formed at lengths that ensure the cylinder parts do not contact each other within the attachment hole. As a result, the fasteners can fix the scale frame to the first measurement target part reliably through the rear-face bushings, the front-face bushings, and the attachment holes.

Preferably, the rear-face bushings and the front-face bushings have the same shape.

According to this configuration, the rear-face bushings and the front-face bushings have the same shape and can therefore be mass-manufactured with ease. The linear scale can therefore reduce manufacturing costs and improve the manufacturing efficiency.

Preferably, the scale frame includes fixed blocks, the fixed blocks being fixed to both ends of the scale frame with respect to the measurement direction, and the fixed blocks including the attachment holes.

In a case where the scale frame is formed, for example, of aluminum through extrusion molding, both ends of the scale frame with respect to the measurement direction will be hollow and have openings. There is thus a problem in that it can be difficult to form the attachment holes.

However, according to the invention, the scale frame includes the fixed blocks, which have the attachment holes and are fixed to both ends of the scale frame with respect to the measurement direction. Thus, even in a case where the attachment holes cannot be formed in the scale frame, the attachment holes in the fixed blocks make it possible to fix the scale frame to the first measurement target part.

Preferably, the scale frame includes, in addition to the attachment holes, a central fixed member for fixing the scale frame to the first measurement target part, the central fixed member being provided in a center of the scale frame with respect to the measurement direction.

According to this configuration, in addition to the attachment holes, the scale frame further includes the central fixed member, in the center of the scale frame with respect to the measurement direction, for fixing the scale frame to the first measurement target part. As a result, the scale frame can be fixed to the first measurement target part in a stable manner without inhibiting expansion/contraction of the scale frame in the measurement direction caused by heat.

DESCRIPTION OF EMBODIMENTS

An embodiment of the invention will be described hereinafter on the basis of the drawings.

Figure 1A:
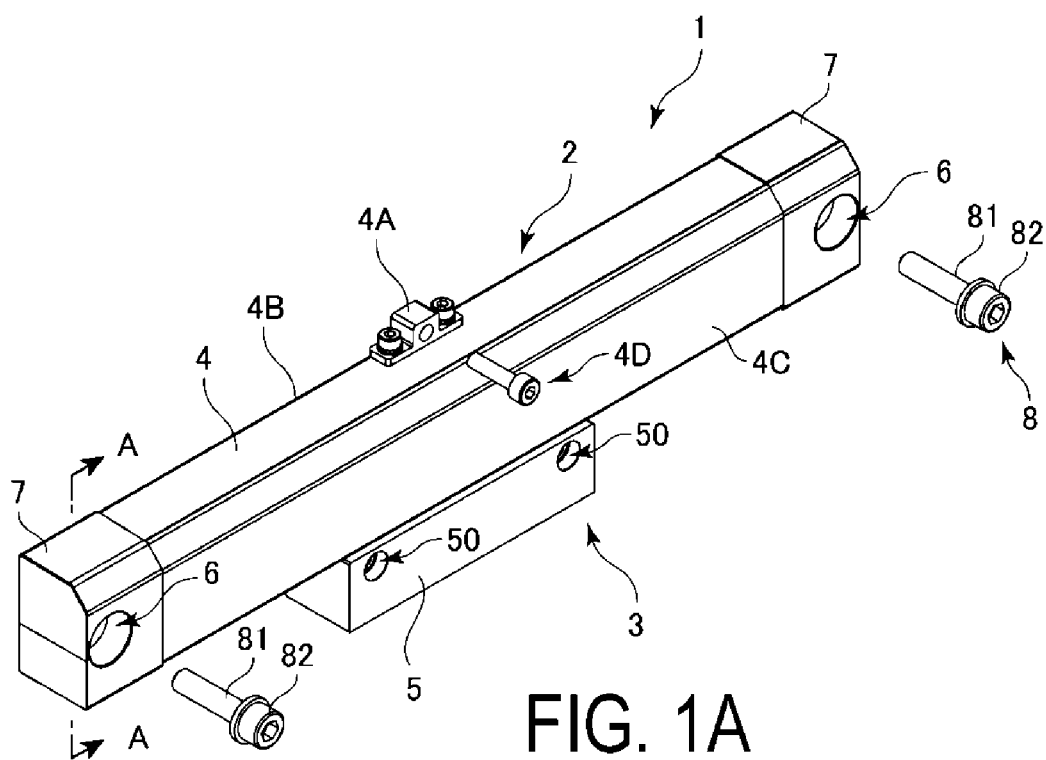
FIGS. 1A and 1B are a perspective view and a side view, respectively, of a linear scale according to the invention.
Figure 1B:
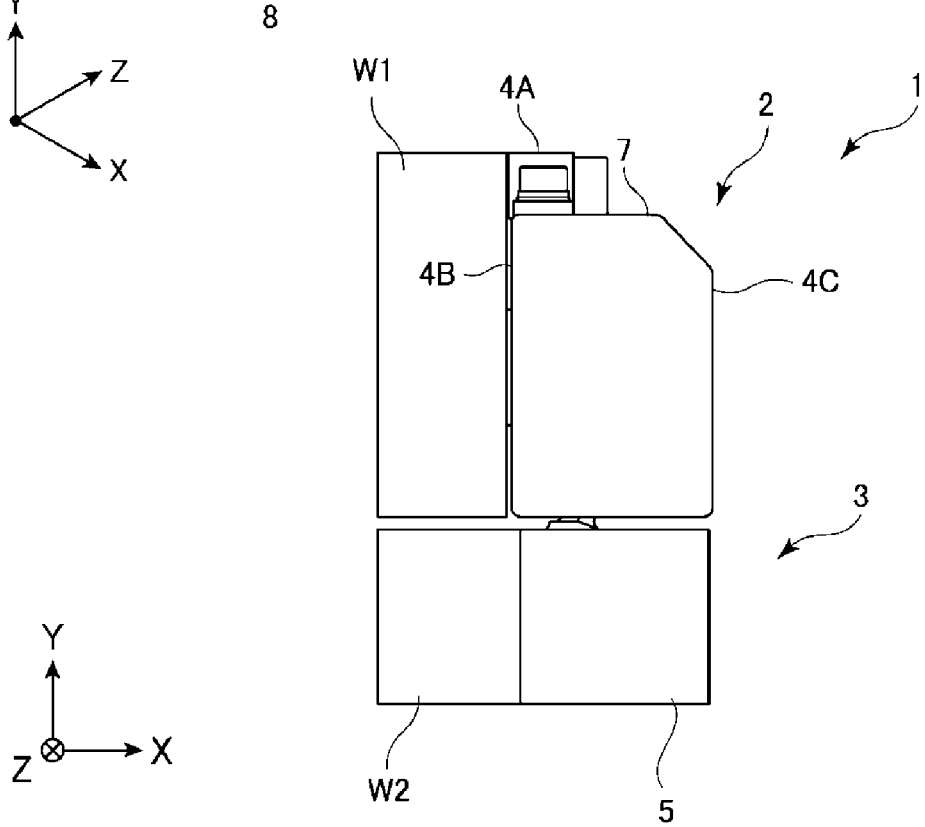
Figure 2:
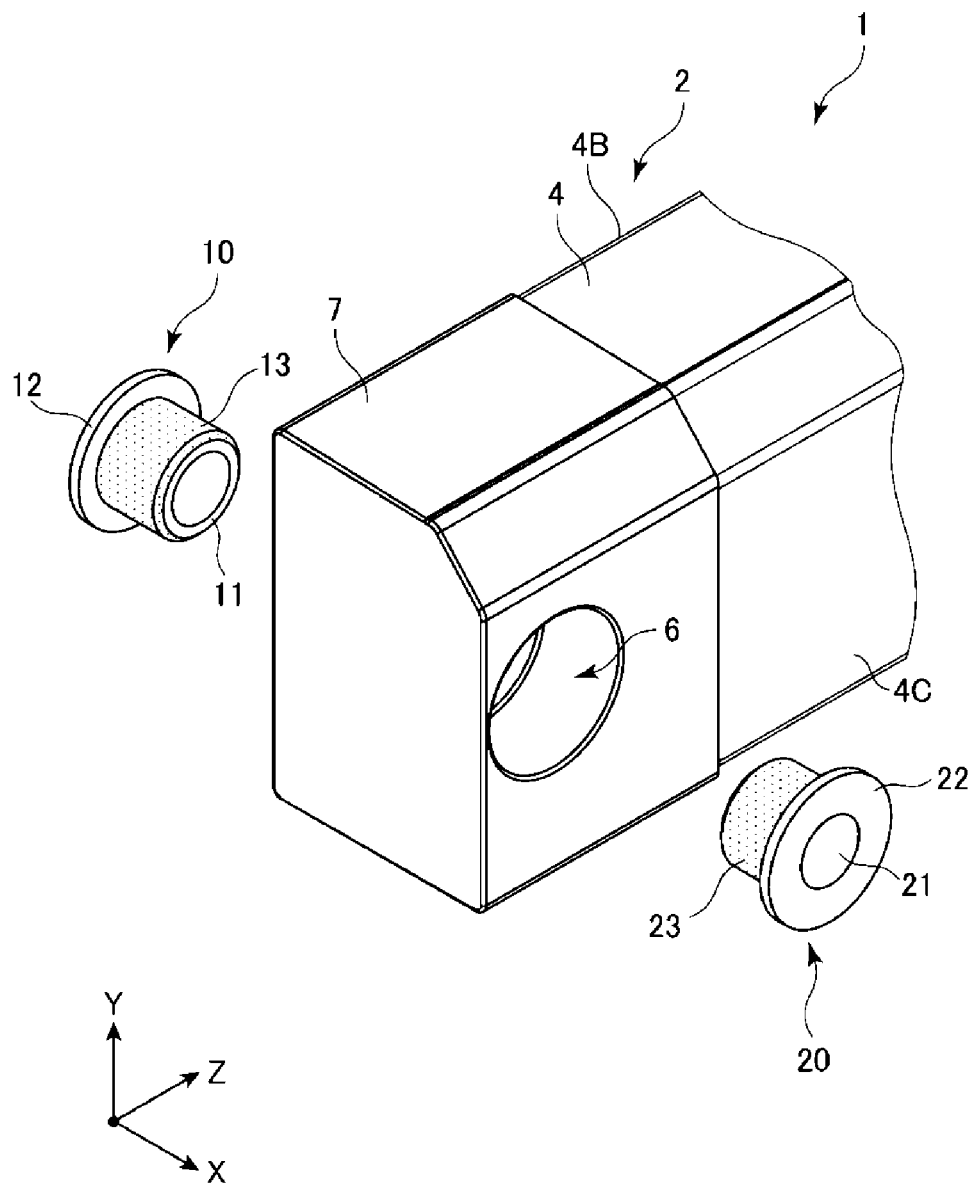
FIG. 2 is a diagram illustrating part of the linear scale according to the invention in an enlarged manner.
Figure 3:
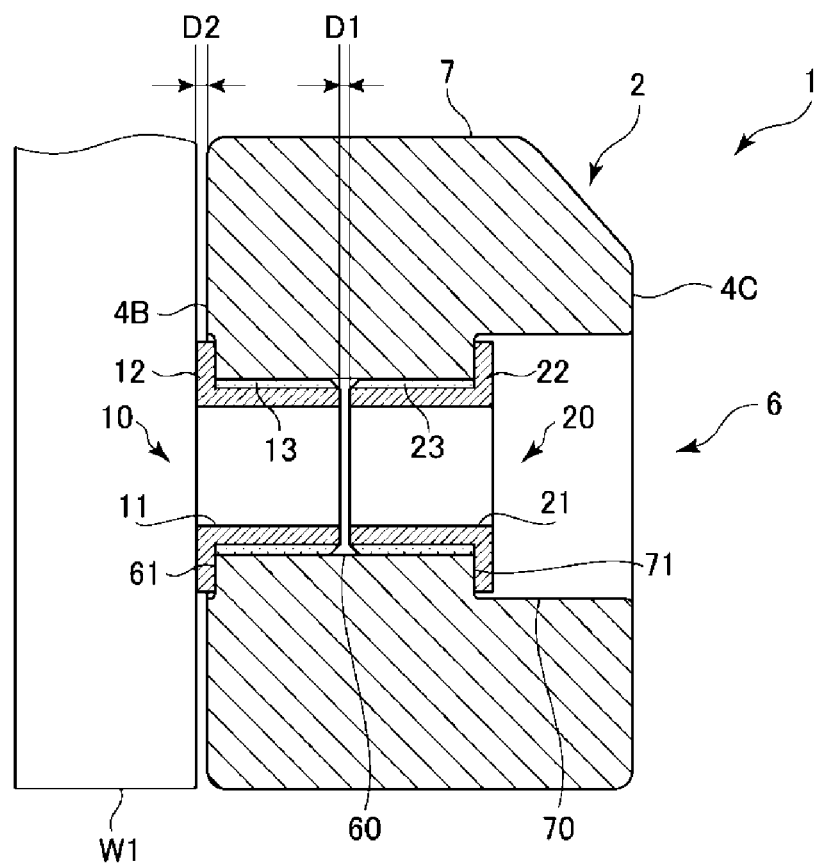
FIG. 3 is a cross-sectional view of the linear scale according to the invention.
Figure 3:
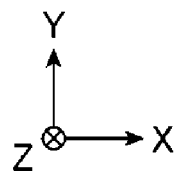

FIGS. 1A to 3 are diagrams illustrating a linear scale according to the invention. Specifically, FIG. 1A is a perspective view of the linear scale, and FIG. 1B is a side view of the linear scale. FIG. 2 is a diagram illustrating a part of the linear scale, on the left side of the depiction in FIG. 1A, in an enlarged manner, and FIG. 3 is a cross-sectional view of the linear scale corresponding to the line A-A in FIG. 1A.

A measurement device 1, which measures a distance of movement between measurement target parts, is a linear scale. As illustrated in FIG. 1, the linear scale includes a measurement device main body 2 and a detector 3 provided capable of moving freely along the measurement device main body 2. The measurement device 1 measures a distance of movement between a pair of a first measurement target part W1 and a second measurement target part W2. The measurement device main body 2 is fixed to the first measurement target part W1, and the detector 3 is fixed to the second measurement target part W2. The pair of the first measurement target part W1 and the second measurement target part W2 are formed mainly of iron.

Note that the pair of the first measurement target part and the second measurement target part W1 and W2 are not illustrated in FIG. 1A.

The measurement device main body 2 is constituted by a long scale frame 4 and a scale (not illustrated) built into the scale frame 4. The scale is formed from a light-transmissive material such as glass, has marks formed in its surface by an optical lattice having a constant pitch, and is fixed to the inside of the scale frame 4. In the following descriptions and the drawings, a direction corresponding to both a longitudinal direction (a measurement direction) of the scale frame 4 and a movement direction of the detector 3 may be referred to as a Z direction; a width direction of the scale frame 4 (a depth direction) orthogonal to the Z direction, as an X direction; and a vertical direction orthogonal to both the X and Z directions, as a Y direction.

The detector 3 includes a detector main body 5 provided outside the scale frame 4 and fixed to the second measurement target part W2, and a detection unit (not illustrated) provided extending into the scale frame 4 from the detector main body 5. The detector main body 5 has detector fixing holes 50 for fixing the detector main body 5 to the second measurement target part W2. The detector fixing holes 50 are formed so as to penetrate from a rear face of the detector main body 5, which faces the second measurement target part W2, to a front face of the detector main body 5, which is the face on the side opposite from the side on which the second measurement target part W2 is located. The detector main body 5 is fixed to the second measurement target part W2 using bolts or the like through the detector fixing holes 50.

The detection unit is constituted by a light-emitting unit that emits light toward the scale and a light-receiving unit that receives light that has passed through the scale from the light-emitting unit. The detection unit generates an electrical signal on the basis of the light received by the light-receiving unit. The detector 3 detects an amount of relative movement with the scale on the basis of the generated electrical signal.

The scale frame 4 is a member formed mainly of aluminum through extrusion molding, and is formed having an overall hollow, substantially rectangular shape. The scale frame 4 has a central fixed member 4A for fixing the scale frame 4 to the first measurement target part W1 at the center of the scale frame 4 with respect to the measurement direction (the Z direction), a rear face 4B facing the first measurement target part W1, and a front face 4C located on a front side and located on the side opposite from the side on which the rear face 4B is located. The central fixed member 4A fixes the scale frame 4 to the first measurement target part W1 using a bolt 4D. Note that any kind of member may be used as the bolt 4D as long as it can fix the scale frame 4 to the first measurement target part W1.

The scale frame 4 also includes fixed blocks 7 that are fixed to the scale frame 4 on both of one end and the other end with respect to the measurement direction. Each of the fixed blocks 7 has a fixing hole 6.

Each of the fixing holes 6 is formed in the corresponding fixed block 7 so as to penetrate from the rear face 4B of the scale frame 4, which faces the first measurement target part W1, to the front face 4C of the scale frame 4, which is on the side opposite from the side on which the first measurement target part W1 is located.

The fixed blocks 7 are formed mainly of aluminum. However, the fixed blocks 7 may be formed of another material, such as iron, rather than aluminum.

The fixing holes 6 formed in the fixed blocks 7 are formed by a cutting process. However, the fixing holes 6 formed in the fixed blocks 7 need not be formed by a cutting process, and may instead be formed using a mold or the like, for example. In other words, it is sufficient that the fixed blocks have fixing holes of prescribed dimensions, and any kind of manufacturing method may be used to form the fixing holes.

The measurement device 1 includes fasteners 8, which are bolts. The measurement device main body 2 (the scale frame 4) is fixed to the first measurement target part W1 by threading the fasteners 8 into the fixing holes 6.

Each of the fasteners 8 includes a shaft part 81 that is passed through the corresponding fixing hole 6 to fix the measurement device main body 2 to the first measurement target part W1, and a head part 82 having a larger diameter than the shaft part 81.

As illustrated in FIG. 2, the measurement device 1 further includes a rear-face bushing 10, which is inserted into the fixing hole 6 from the rear face 4B side of the scale frame 4, and a front-face bushing 20, which is inserted into the fixing hole 6 from the front face 4C side of the scale frame 4.

The rear-face bushing 10 and the front-face bushing 20 have the same shape. The respective bushings include: cylinder parts 11 and 21, into which the shaft parts 81 of the fasteners 8 are inserted and which are inserted into the fixing holes 6; flanges 12 and 22 formed at ends of the cylinder parts 11 and 21, respectively; and cylinder-shaped elastic members 13 and 23, which are provided so as to cover the outer circumferential surfaces of the cylinder parts 11 and 21, respectively.

The elastic members 13 and 23 are rubber provided across the entire circumferences and entire lengths of the outer circumferential surfaces of the cylinder parts 11 and 21, respectively. However, rather than rubber, the elastic members 13 and 23 may be any material exhibiting elasticity, such as silicon.

As illustrated in FIG. 3, each fixing hole 6 has an attachment hole 60 into which the rear-face bushing 10 and the front-face bushing 20 are inserted, and a fastener accommodation hole 70 that accommodates the head part 82 of the fastener 8 (see FIG. 1A).

In terms of their relationships with the attachment hole 60, the rear-face bushing 10 and the front-face bushing 20 are formed so that the cylinder parts 11 and 21 thereof are shorter than the length of the attachment hole 60 with respect to the penetration direction (the X direction), and are formed having outer diameters that are smaller than the inner diameter of the attachment hole 60. The cylinder parts 11 and 21 are formed at lengths that ensure the cylinder parts 11 and 21 do not contact each other within the attachment hole 60.

The flanges 12 and 22 of the rear-face bushing 10 and the front-face bushing 20, respectively, have outer diameters larger than the inner diameter of the attachment hole 60.

The flange 12 is formed at the end of the cylinder part 11 located toward the first measurement target part W1, i.e. the end of the cylinder part 11 located toward the rear face 4B of the scale frame 4, when the rear-face bushing 10 is inserted into the attachment hole 60. Likewise, the flange 22 is formed at the end of the cylinder part 21 located toward the front face 4C of the scale frame 4, when the front-face bushing 20 is inserted into the attachment hole 60.

In terms of the relationships between the rear-face bushing 10, the front-face bushing 20, and the attachment hole 60, the shaft part 81 of the fastener 8 is inserted into the cylinder parts 11 and 21, and the head part 82 of the fastener 8 has an outer diameter larger than the inner diameter of the attachment hole 60.

The shaft part 81 of the fastener 8 fixes the scale frame 4 to the first measurement target part W1 through the rear-face bushing 10, the front-face bushing 20, and the attachment hole 60.

The head part 82 of the fastener 8 is accommodated by the fastener accommodation hole 70 when the scale frame 4 is fixed to the first measurement target part W1 by the shaft part 81.

The attachment hole 60 has a first contact face 61 that contacts the flange 12 of the rear-face bushing 10. The fastener accommodation hole 70 has a second contact face 71 that contacts the flange 22 of the front-face bushing 20.

The cylinder parts 11 and 21 form a gap D1 within the attachment hole 60 when the rear-face bushing 10 is inserted into the attachment hole 60 until the rear-face bushing 10 contacts the first contact face 61 and the front-face bushing 20 is inserted into the attachment hole 60 until the front-face bushing 20 contacts the second contact face 71.

Furthermore, the flange 12 forms a gap D2 between the first measurement target part W1 and the measurement device main body 2 (the scale frame 4) when the rear-face bushing 10 is inserted into the attachment hole 60 until the rear-face bushing 10 contacts the first contact face 61. The flange 12 may be formed at any thickness as long as the gap D2 can be formed between the first measurement target part W1 and the measurement device main body 2.

Figure 4:
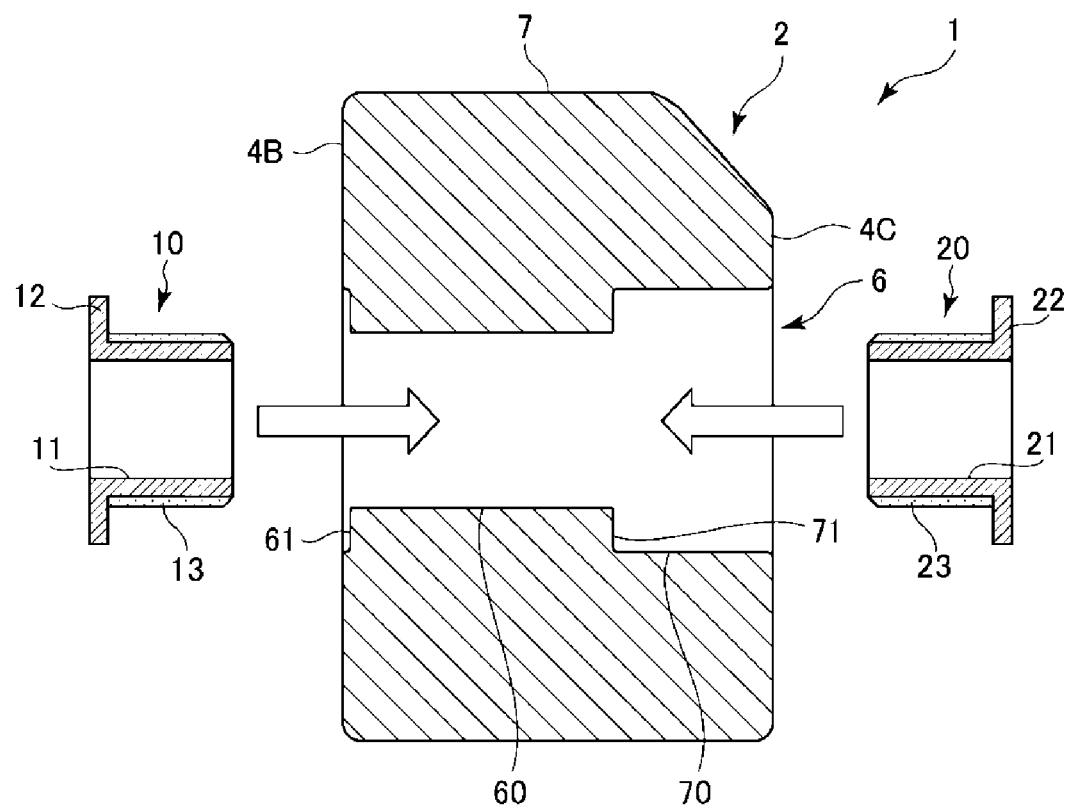
FIG. 4 is a cross-sectional view of insertion positions of a rear-face bushing and a front-face bushing according to the invention.
Figure 5:
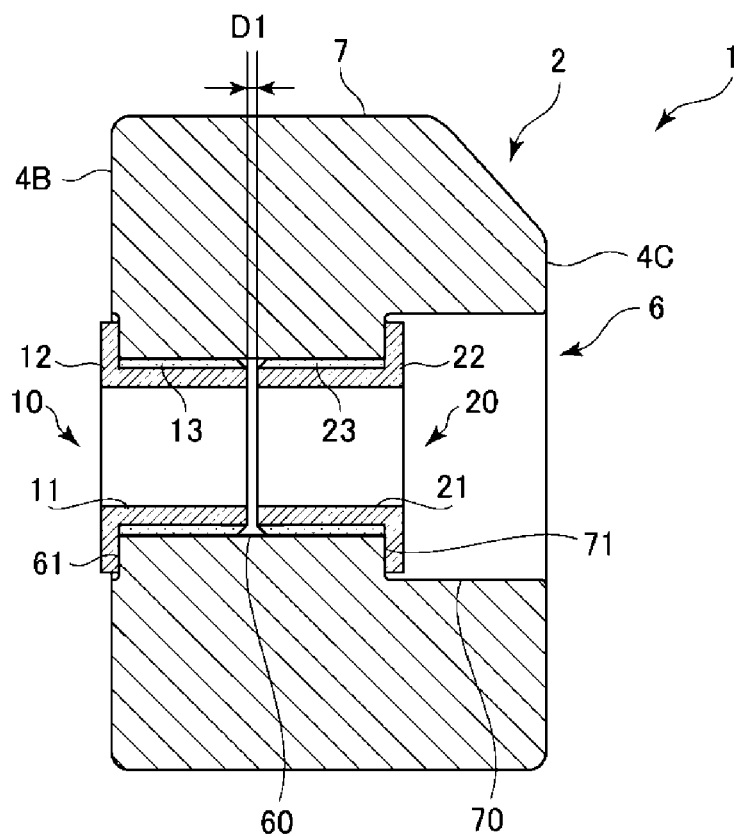
FIG. 5 is a cross-sectional view illustrating the insertion of the rear-face bushing and the front-face bushing into an attachment hole, according to the invention.
Figure 5:
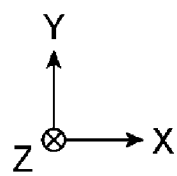
Figure 6:
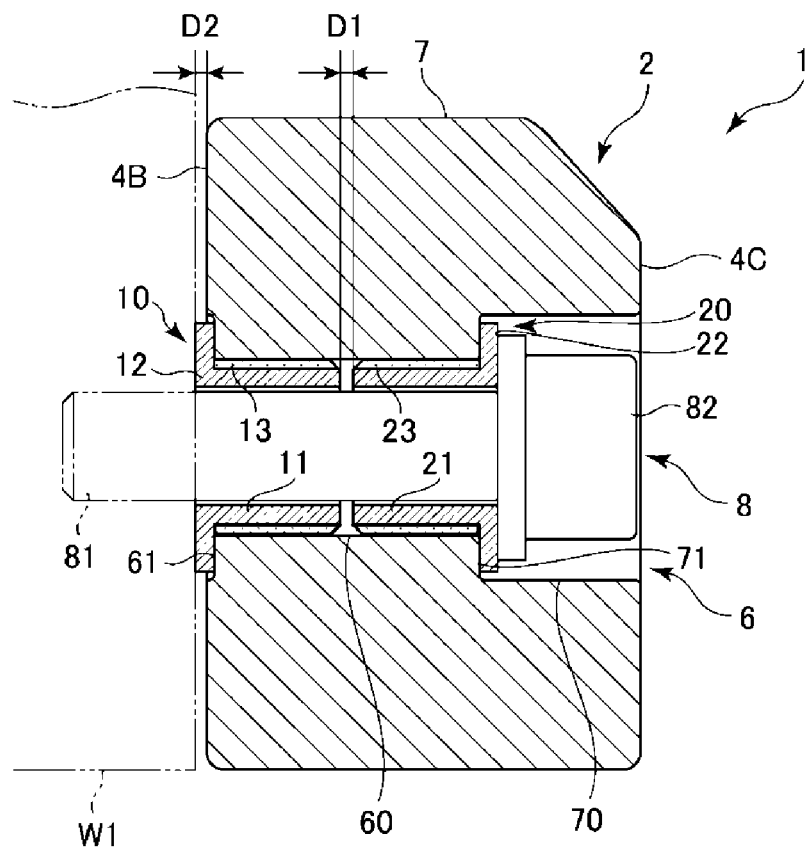
FIG. 6 is a cross-sectional view illustrating a state in which a scale frame is fixed to a first measurement target part using a fastener according to the invention.

FIGS. 4 to 6 are diagrams illustrating a method for attaching the first measurement target part to the measurement device main body. More specifically, FIGS. 4 to 6 are cross-sectional views corresponding to the line A-A in FIG. 1A. FIG. 4 is a cross-sectional view of insertion positions of the rear-face bushing and the front-face bushing according to the invention; FIG. 5 is a cross-sectional view illustrating the insertion of the rear-face bushing and the front-face bushing into the attachment hole, according to the invention; and FIG. 6 is a cross-sectional view illustrating a state in which the scale frame is fixed to the first measurement target part using the fastener according to the invention.

A method for attaching the measurement device main body 2 to the first measurement target part W1 will be described next with reference to FIGS. 4 to 6.

With respect to the method for attaching the measurement device main body 2 to the first measurement target part W1, first, as illustrated in FIG. 4, the manufacturer inserts the rear-face bushing 10 into the attachment hole 60 from the rear face 4B side in the direction of the arrow (from the left side toward the right side in FIG. 4) and inserts the front-face bushing 20 into the attachment hole 60 from the front face 4C side in the direction of the arrow (from the right side toward the left side in FIG. 4).

Next, as illustrated in FIG. 5, the manufacturer inserts the rear-face bushing 10 into the attachment hole 60 until the rear-face bushing 10 and the first contact face 61 make contact. The manufacturer also inserts the front-face bushing 20 into the attachment hole 60 until the front-face bushing 20 and the second contact face 71 make contact. The gap D1 is formed within the attachment hole 60 by the cylinder parts 11 and 21 of the rear-face bushing 10 and the front-face bushing 20, respectively, when the rear-face bushing 10 and the front-face bushing 20 are inserted into the attachment hole 60.

The measurement device 1 is shipped with the rear-face bushing 10 and the front-face bushing 20 inserted into the attachment hole 60.

Next, as illustrated in FIG. 6, a user inserts the fastener 8 into the fixing hole 6 from the front face 4C side. The shaft part 81 of the fastener 8 fixes the measurement device main body 2 to the first measurement target part W1 through the rear-face bushing 10, the front-face bushing 20, and the attachment hole 60. The gap D2 is formed between the measurement device main body 2 and the first measurement target part W1 by the flange 12 of the rear-face bushing 10 when the measurement device main body 2 is fixed to the first measurement target part W1.

Figure 7:
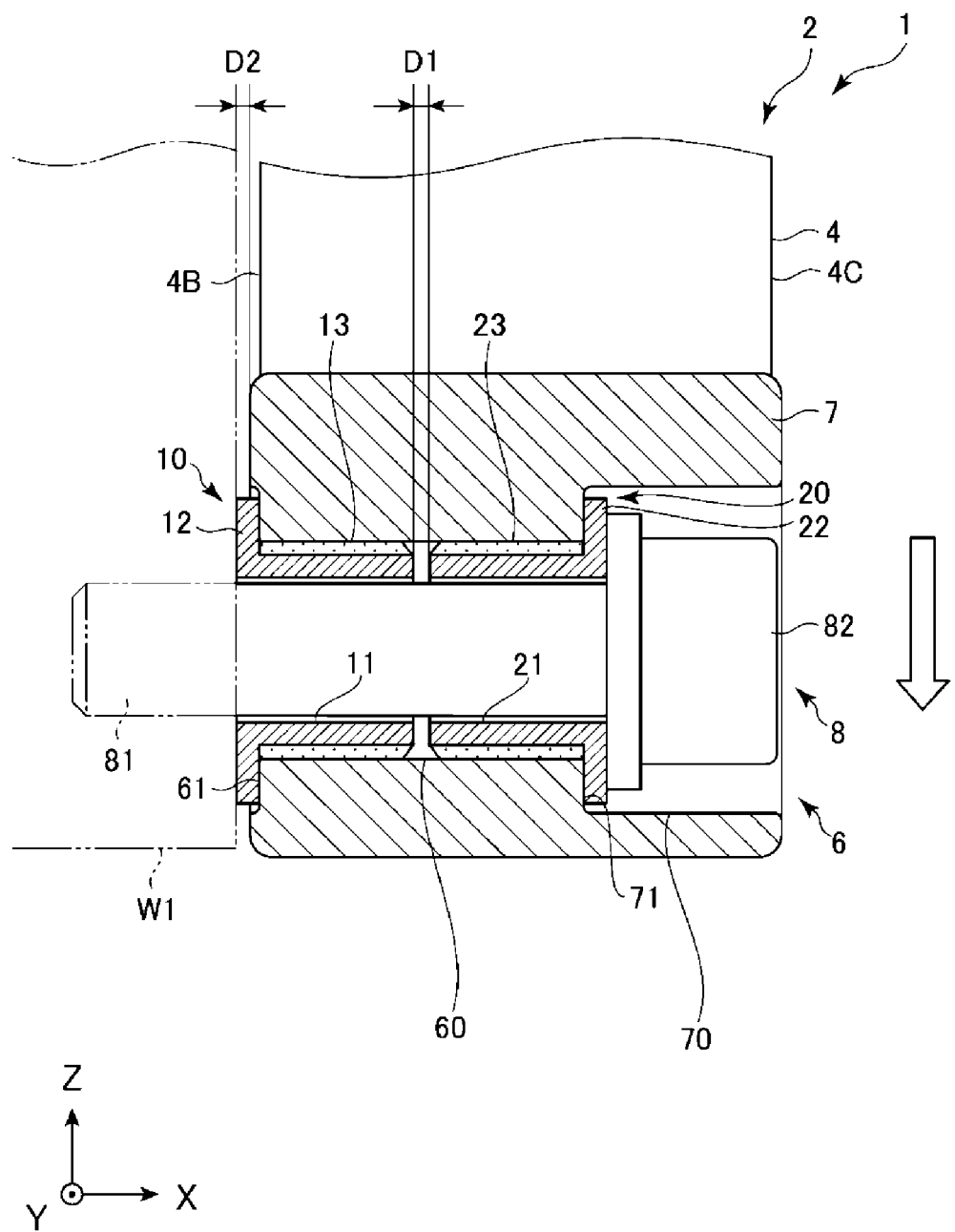
FIG. 7 is a partial cross-sectional view illustrating a state before movement in an expansion/contraction direction of the scale frame according to the invention.
Figure 8:
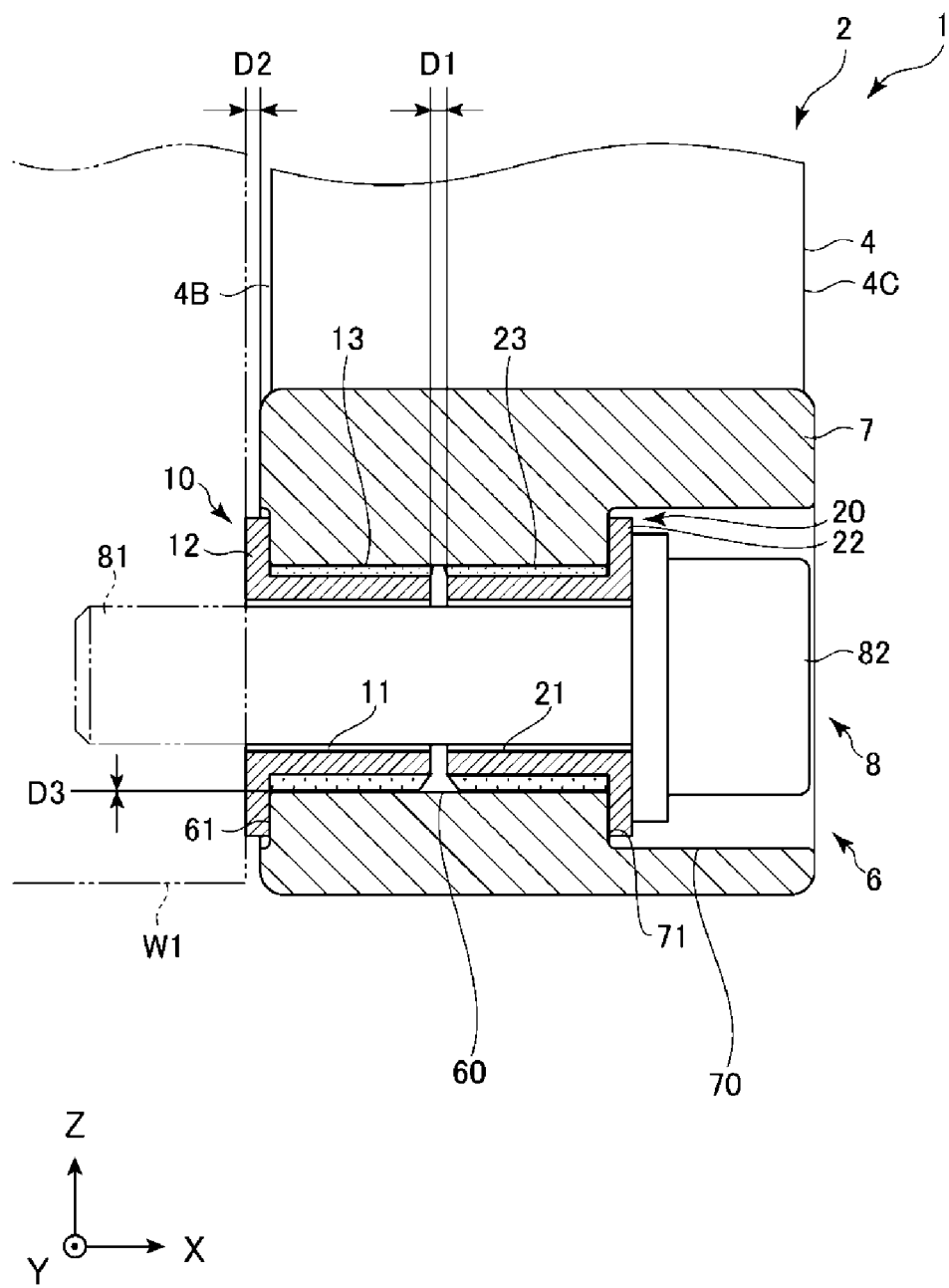
FIG. 8 is a partial cross-sectional view illustrating a state after movement in the expansion/contraction direction of the scale frame according to the invention.

FIGS. 7 and 8 are diagrams illustrating movement in an expansion/contraction direction of the scale frame, according to the invention.

Specifically, FIG. 7 is a partial cross-sectional view illustrating a state before movement in the expansion/contraction direction of the scale frame according to the invention, and FIG. 8 is a partial cross-sectional view illustrating a state after movement in the expansion/contraction direction of the scale frame according to the invention. FIGS. 7 and 8 are partial cross-sectional views of the fixed block 7 illustrated in FIG. 2, seen from the top side (the +Y direction side) in FIG. 2.

Movement in the expansion/contraction direction of the scale frame 4 will be described next with reference to FIGS. 7 and 8.

The scale frame 4 is fixed by the central fixed member 4A (see FIGS. 1A and 1B) at the center of the scale frame 4 with respect to the measurement direction (the Z direction), and thus extends in the +Z direction and the −Z direction under heat, such as when the temperature around the measurement device 1 rises. Thus in FIG. 7, the scale frame 4 extends in the −Z direction (the direction of the arrow).

As illustrated in FIG. 7, the scale frame 4 extending also causes the fixed block 7 to move in the −Z direction. The measurement device main body 2 is fixed to the first measurement target part W1, and thus in a case where the rear-face bushing 10 and the front-face bushing 20 are not present, the movement of the fixed block 7 will be restricted by the shaft part 81 of the fastener 8. Thermal stress arises in the scale frame 4 if the movement of the fixed block 7 is restricted.

However, the fastener 8 fixes the measurement device main body 2 to the first measurement target part W1 through the rear-face bushing 10, the front-face bushing 20, and the attachment hole 60. The elastic members 13 and 23 of the rear-face bushing 10 and the front-face bushing 20, respectively, enable the fixed block 7 to move by the amount by which the scale frame 4 has extended.

Specifically, as illustrated in FIG. 8, when the scale frame 4 extends in the −Z direction, the parts of the elastic members 13 and 23 on the +Z direction side (the top side in FIG. 8) are compressed and deform by the amount by which the scale frame 4 has extended. The deformed elastic members 13 and 23 deform toward the gap D1 so as to fill the gap D1. Meanwhile, a gap D3 equivalent to the amount by which the elastic members 13 and 23 are compressed is formed within the attachment hole 60, on the −Z direction side (the bottom side in FIG. 8).

As such, even in a case where the scale frame 4 extends in the −Z direction, the elastic members 13 and 23 of the rear-face bushing 10 and the front-face bushing 20, respectively, enable the fixed block 7 to move by the amount by which the scale frame 4 has extended.

According to this embodiment, the following effects can be achieved.

(1) The rear-face bushing 10 of the measurement device 1 includes: the cylinder part 11, which is formed shorter than the length of the attachment hole 60 with respect to the penetration direction and is formed having an outer diameter smaller than the inner diameter of the attachment hole 60; the flange 12, which is formed at the end of the cylinder part 11 located toward the first measurement target part W1 and which has an outer diameter greater than the inner diameter of the attachment hole 60; and the elastic member 13, which is cylindrical in shape and is provided covering the outer circumferential surface of the cylinder part 11. Accordingly, thermal stress arising in the scale frame 4 can be absorbed by the elastic member 13 without inhibiting expansion/contraction of the scale frame 4 caused by heat.

(2) The measurement device 1 can easily absorb thermal stress arising in the scale frame 4 simply by inserting the rear-face bushing 10 into the attachment hole 60, without the need for a process such as cutting to be carried out on a parallel plate spring mechanism or the like.

Accordingly, the measurement device 1 can ensure the precision of detection by the detector 3 by suppressing deformation of the scale, can reduce manufacturing costs, and can improve manufacturing efficiency.

(3) The rear-face bushing 10 is inserted into the attachment hole 60 from the rear face 4B side of the scale frame 4, and thus the gap D2 is formed by the flange 12 between the first measurement target part W1 and the scale frame 4. The rear-face bushing 10 separates the first measurement target part W1 and the scale frame 4 as a result, and thus the measurement device 1 can suppress the transmission of heat from the first measurement target part W1 to the scale frame 4 and suppress the occurrence of thermal stress.

(4) The fastener 8 includes: the shaft part 81, which is inserted into the cylinder part 11 formed shorter than the length of the attachment hole 60 with respect to the penetration direction; and the head part 82, which has an outer diameter greater than the inner diameter of the attachment hole 60. Accordingly, the scale frame 4 can be fixed to the first measurement target part W1 through the rear-face bushing 10 and the attachment hole 60.

(5) The measurement device 1 further includes the front-face bushing 20, which is constituted by: the cylinder part 21 and the elastic member 23, which have the same configurations as the corresponding elements of the rear-face bushing 10; and the flange 22, which is formed at the end of the cylinder part 21 located toward the front face 4C side of the scale frame 4 and which has an outer diameter greater than the inner diameter of the attachment hole 60. The fastener 8 fixes the scale frame 4 to the first measurement target part W1 through the rear-face bushing 10, the front-face bushing 20, and the attachment hole 60. The fastener 8 thus indirectly fixes the scale frame 4 to the first measurement target part W1 through the front-face bushing 20, and as a result, the elastic members 13 and 23 of the rear-face bushing 10 and the front-face bushing 20, respectively, can efficiently absorb thermal stress arising in the scale frame 4.

(6) The cylinder parts 11 and 21 of the rear-face bushing 10 and the front-face bushing 20, respectively, are formed at lengths that ensure the cylinder parts 11 and 21 do not contact each other within the attachment hole 60. As a result, the fastener 8 can fix the scale frame 4 to the first measurement target part W1 reliably through the rear-face bushing 10, the front-face bushing 20, and the attachment hole 60.

(7) The rear-face bushing 10 and the front-face bushing 20 have the same shape and can therefore be mass-manufactured with ease. The measurement device 1 can therefore reduce manufacturing costs and improve the manufacturing efficiency.

(8) The scale frame 4 includes the fixed blocks 7, which have the attachment holes 60 and are fixed to both ends of the scale frame 4 with respect to the measurement direction. Thus, even in a case where the attachment holes 60 cannot be provided in the scale frame 4, the fixed blocks 7, which include the attachment holes 60, make it possible to fix the scale frame 4 to the first measurement target part W1.

(9) In addition to the attachment holes 60, the scale frame 4 includes the central fixed member 4A, in the center of the scale frame 4 with respect to the measurement direction, which fixes the scale frame 4 to the first measurement target part W1. As a result, the scale frame 4 can be fixed to the first measurement target part W1 in a stable manner without inhibiting expansion/contraction of the scale frame 4 in the measurement direction caused by heat.

VARIATIONS ON EMBODIMENTS

Note that the invention is not limited to the foregoing embodiment, and variations, improvements, and the like that fall within a scope in which the object of the invention can be achieved are also included within the invention.

For example, although the measurement device 1 includes the rear-face bushing 10 and the front-face bushing 20 in the foregoing embodiment, the measurement device 1 may include only the rear-face bushing 10. Furthermore, although the rear-face bushing 10 and the front-face bushing 20 are described as having the same shape, the bushings need not have the same shape. For example, the cylinder part 21 of the front-face bushing 20 may be formed longer than the cylinder part 11 of the rear-face bushing 10, or the cylinder part 21 of the front-face bushing 20 may be formed shorter than the cylinder part 11 of the rear-face bushing 10. In other words, it is sufficient that the rear-face bushing and the front-face bushing are formed at lengths that ensure the bushings do not contact each other within the attachment hole.

Although the central fixed member 4A is described as being formed in the center of the scale frame 4 with respect to the measurement direction in the foregoing embodiment, the central fixed member 4A may be formed in the approximate center of the scale frame 4 to enable the scale frame 4 to be fixed to the first measurement target part W1.

Furthermore, although the measurement device main body 2 is described as including the fixed blocks 7 having the fixing holes 6 (attachment holes 60), the attachment holes may instead be formed in the scale frame. In other words, it is sufficient for the measurement device to include attachment holes into which the rear-face bushing and the front-face bushing of the invention can be inserted.

Although the elastic members 13 and 23 of the rear-face bushing 10 and the front-face bushing 20, respectively, are described in the foregoing embodiment as being provided across the entire outer circumferential surfaces and entire lengths of the cylinder parts 11 and 21, the elastic members may be provided in cylindrical shapes covering parts of the outer circumferential surfaces of the cylinder parts 11 and 21, rather than across the entire lengths of the outer circumferential surfaces. For example, a plurality of cylindrical-shaped elastic members may be provided at constant intervals along the outer circumferential surfaces of the cylinder parts 11 and 21.

In other words, it is sufficient for the elastic members to be provided in cylindrical shapes covering the outer circumferential surfaces of the cylinder parts of the rear-face bushing and the front-face bushing.

Although the fasteners 8 are described as bolts in the foregoing embodiment, the fasteners may be any items that include shaft parts inserted into the cylinder parts of the rear-face bushing and the front-face bushing and head parts having outer diameters greater than the inner diameters of the attachment holes, and that can fix the scale frame to the first measurement target part.

INDUSTRIAL APPLICABILITY

As described thus far, the invention can be used favorably as a linear scale that can ensure the precision of detection by a detector by suppressing deformation of a scale, can reduce manufacturing costs, and can improve manufacturing efficiency.

REFERENCE SIGNS LIST

1 Measurement device
2 Measurement device main body
4 Scale frame
4A Central fixed member
4B Rear face
4C Front face
7 Fixed block
8 Fastener
10 Rear-face bushing
11 Cylinder part
12 Flange
13 Elastic member
20 Front-face bushing
21 Cylinder part
22 Flange
23 Elastic member
60 Attachment hole
W1 First measurement target part

The invention claimed is:

1. A linear scale comprising:
a long scale frame, the long scale frame being fixed to a first measurement target part and containing a scale;
a detector, the detector being fixed to a second measurement target part and configured to detect an amount of relative movement with the scale;
attachment holes, the attachment holes being provided on both of one end side and another end side of the scale frame with respect to a measurement direction, the attachment holes being formed penetrating from a rear face of the scale frame facing the first measurement target part to a front face of the scale frame located on the side opposite from the side on which the first measurement target part is located;
rear-face bushings inserted into the attachment holes from a rear face side of the scale frame; and
fasteners configured to fix the scale frame to the first measurement target through the attachment holes and the rear-face bushings,
wherein each of the rear-face bushings includes:
a cylinder part formed shorter than the length of the attachment hole with respect to a penetration direction and having an outer diameter smaller than an inner diameter of the attachment holes;
a flange formed at the end of the cylinder part located toward the first measurement target part and having an outer diameter greater than the inner diameter of the attachment holes; and
an elastic member, the elastic member having a cylindrical shape and being provided covering an outer circumferential surface of the cylinder part, and
each of the fasteners includes:
a shaft part inserted into the cylinder part; and
a head part having an outer diameter greater than the inner diameter of the attachment holes.

2. The linear scale according to claim 1, further comprising:
front-face bushings inserted into the attachment holes from a front face side of the scale frame,
wherein each of the front-face bushings includes:
a cylinder part formed shorter than the length of the attachment hole with respect to a penetration direction and having an outer diameter smaller than an inner diameter of the attachment holes;
a flange formed at the end of the cylinder part located toward the front face side of the scale frame and having an outer diameter greater than the inner diameter of the attachment holes; and
an elastic member, the elastic member having a cylindrical shape and being provided covering an outer circumferential surface of the cylinder part,
the cylinder parts of the rear-face bushings and the front-face bushings are formed at lengths ensuring that the cylinder parts do not contact each other within the attachment holes; and the fasteners configured to fix the scale frame to the first measurement target part through the rear-face bushings, the front-face bushings, and the attachment holes.

3. The linear scale according to claim 2, wherein the rear-face bushings and the front-face bushings have the same shape.

4. The linear scale according to claim 1, wherein the scale frame includes fixed blocks, the fixed blocks being fixed to both ends of the scale frame with respect to the measurement direction, and the fixed blocks including the attachment holes.

5. The linear scale according to claim 1, wherein the scale frame further includes, in addition to the attachment holes, a central fixed member for fixing the scale frame to the first measurement target part, the central fixed member being provided in a center of the scale frame with respect to the measurement direction.

6. The linear scale according to claim 2, wherein the scale frame includes fixed blocks, the fixed blocks being fixed to both ends of the scale frame with respect to the measurement direction, and the fixed blocks including the attachment holes.

7. The linear scale according to claim 3, wherein the scale frame includes fixed blocks, the fixed blocks being fixed to both ends of the scale frame with respect to the measurement direction, and the fixed blocks including the attachment holes.

8. The linear scale according to claim 2, wherein the scale frame further includes, in addition to the attachment holes, a central fixed member for fixing the scale frame to the first measurement target part, the central fixed member being provided in a center of the scale frame with respect to the measurement direction.

9. The linear scale according to claim 3, wherein the scale frame further includes, in addition to the attachment holes, a central fixed member for fixing the scale frame to the first measurement target part, the central fixed member being provided in a center of the scale frame with respect to the measurement direction.

10. The linear scale according to claim 4, wherein the scale frame further includes, in addition to the attachment holes, a central fixed member for fixing the scale frame to the first measurement target part, the central fixed member being provided in a center of the scale frame with respect to the measurement direction.

* * * * *